March 12, 1940.  J. L. UNDERHILL  2,193,082
FILM PHONOGRAPH
Filed May 28, 1938
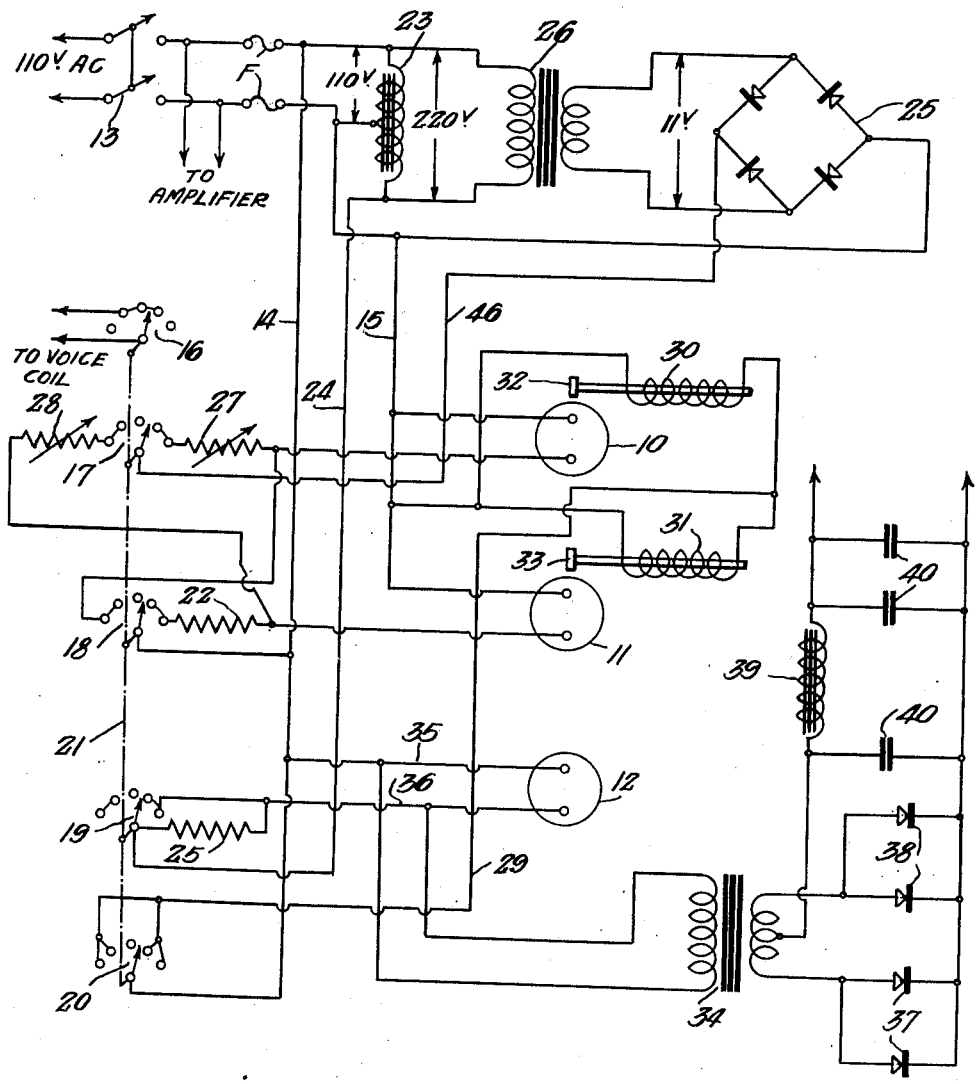
Inventor
*Joseph L. Underhill*
By *J. Huff*
Attorney Patented Mar. 12, 1940

2,193,082

UNITED STATES PATENT OFFICE 2,193,082

FILM PHONOGRAPH

Joseph L. Underhill, London, England, assignor to Radio Corporation of America, a corporation of Delaware Application May 28, 1938, Serial No. 210,591

7 Claims. (Cl. 179—100.3)

This invention relates to film phonographs and more particularly to film phonographs of the photoelectric type, peculiarly adapted for operation with relatively thin film, such as the varieties thereof formed from regenerated cellulose.

In the film phonographs of the prior art of which I am aware, difficulty has been encountered with such thin films in providing proper tension on the film at both the let-off and takeup reels concurrently with feeding the film past the reproduction point. Likewise, difficulties have been encountered due to noises in the loudspeaker during reversal and/or rewinding of the film. The present invention avoids these difficulties by the use of appropriate individual motors at the let-off and takeup reels and at the sound reproduction point combined with a unitary control means for these motors which simultaneously controls appropriate brakes and also short circuits the voice coil of the loudspeaker.

One object of the invention is to provide an improved means for providing proper film tension in a film phonograph.

Another object of the invention is to provide an improved reversing and rewinding mechanism for a film phonograph.

Another object of the invention is to provide an improved brake mechanism for the let-off reel of a film phonograph.

Another object of the invention is to provide an improved brake mechanism to prevent over-running of the reels in a device of the class described.

Another object of the invention is to provide a mechanism attaining the aforesaid objects which is applicable to a film phonograph alone or in a motion picture machine per se.

Other and incidental objects of my invention will be apparent to those skilled in the art from a reading of the following specification and an inspection of the accompanying drawing, in which the single figure is a schematic diagram of my improved apparatus.

As is customary in film phonographs, the apparatus is provided with a let-off reel containing the film about to be played and a take-up reel for the film which has been played, together with means for reproducing sound from the film at a point between these two reels. In my improved film phonograph, the let-off reel is provided with a motor 10 and the take-up reel is provided with a motor 11. Each of these motors is preferably a 110 volt A. C. motor. In this film phonograph, the film is driven past the reproduction point by a separate motor 12 which is illustrated as a 220 volt synchronous A. C. motor but may be obviously of any other suitable type. This motor may be used to drive a sprocket film drum or other film transporting means adjacent the reproduction point.

Power for the apparatus is supplied from a 110 volt A. C. line through a main switch 13, power from this switch being transmitted to an amplifier of customary type. Current from this switch passes through the fuses F of appropriate size to the leads 14 and 15 whence it is transmitted through the switch 18 selectively to the motors 10 or 11 operating either the takeup or the rewind reel in its proper direction according to the position of the switch 18.

Switches 16, 17, 18, 19 and 20 are mechanically connected together as indicated at 21 so as to produce simultaneous switching of all of the several circuits. The contact points of the several switches may be considered as numbered in the clockwise direction from 1 to 5. The switch 16 is connected to the voice coil of the loudspeaker, the second, third and fourth points of this switch being connected together so that the voice coil of the loudspeaker is short circuited when the switch is on either of these three points. The first or left hand point represents the rewind position; the second point is an intermediate point between the off and rewind positions; the third or middle point is an off position; the fourth point is an intermediate point between the off and the run positions; and the fifth or extreme right-hand point is the run position. The foregoing positions apply, as pointed out before, to all of the several switches hereinafter referred to more specifically.

When the switch 18 is in the extreme left hand position, or the second position, 110 volts A. C. is supplied to the rewind motor 10 causing it to rotate in the rewind direction and correspondingly pulling the film through the apparatus. When the switch 18 is in the fourth or fifth positions, 110 volts A. C. is supplied to the motor 11 through the 100 ohm resistance 22, causing the takeup motor 11 to rotate in the proper direction and withdraw film from the translating point.

Current from the 110 volt supply switch 13 passes also to the auto transformer 23, which steps the 110 volts A. C. up to 220 volts which, in turn, is passed through the leads 14 and 24 to the switch 19. When the switch 19 is on either the fourth or fifth contact points, current passes through this switch to the drive motor 12 which is driven only in the running position of the apparatus, this portion of the film driving mechanism being driven through the takeup motor in the reverse direction. A 2,000 ohm resistor 25 is provided across the switch 19 to prevent arcing.

Current from the auto transformer 23 also passes to a second transformer 26 where it is stepped down to 11 volts. This 11 volt current is passed through a bridge type dry rectifier circuit 25 including the usual arrangement of four dry rectifiers producing a corresponding uni-directional current which is transmitted through the leads 15 and 26. This uni-directional current passes to the switch 17 which has two variable 10 ohm resistors 27 and 28 connected to its fourth and fifth and first and second contacts, respectively. This switch 17 is so connected that when either the takeup or the rewind motor is being operated on 110 volt A. C. the motor has direct current transmitted to it through the resistance 27 or 28, as the case may be, thereby producing a very uniform braking effect on whichever reel the film is being drawn from and preventing over-running of the film.

Current from the 110 volt A. C. line also passes through the lead 14 to the switch 20; from the switch this current passes in either the forward or reverse positions of the film through the lead 29 to the solenoids 30 and 31 which actuate solenoid brakes 32 and 33, respectively, either on the motors 10 and 11 or on apparatus connected thereto. When the switch 20 is in the middle or off position, the brakes 32 and 33 are both applied and likewise if the main switch 13 is turned off, these brakes are applied, thereby preventing overrunning of the film due to momentum. When the switch 20 is on either the first, second, fourth or fifth positions, the brakes 32 and 33 are both released, thereby permitting the film reel motors 10 and 11 to control the film in accordance with the current supplied to them.

The resistors 27 and 28 are so adjusted that the direct current passing through the motors 10 or 11 when these motors are operating as a drag does not exceed the value of the alternating current which would normally pass through the motors, and the current is preferably kept below the point at which the heating value of the current would be the same as that of the normal operating alternating current of these motors.

A transformer 34 is connected to the leads 35 and 36 of the drive motor 12 and current from this transformer is passed through the rectifiers 37 and 38 which are oppositely connected to form a full wave rectifier and through the filter circuit composed of inductance 39 and the condensers 40 to the usual exciter lamp for illuminating the film at the reproduction point. Since the transformer 34 is connected to the supply circuit of the motor 12, the exciter lamp is illuminated only when the apparatus is in the running position.

It will be apparent that when the switch bank 16—20 is turned from the extreme right hand or running position to the fourth position, the voice coil of the loudspeaker will be short circuited and sound output will cease. When turned farther to the middle position, the takeup motor 11 and running motor 12 will be stopped, the direct current will be removed from the motor 10, the exciter lamp circuit 34 et seq. will be turned off and the solenoid brakes 32 and 33 will be applied. When the switch is turned still further to the second position, direct current will be applied to the takeup motor 11, alternating current will be applied to the rewind motor 10 and the brakes 32 and 33 will be released and, when the switches are turned still further to the first position, the short circuit will be removed from the voice coil, being no longer needed after the extinguishment of the exciter lamp and the film will be rewound. The reverse sequence of operation follows, of course, when the switch is turned in a counterclockwise direction.

Having now described my invention, I claim:

1. Apparatus of the class described including an A. C. takeup motor, an A. C. rewind motor, a source of A. C., a source of D. C., solenoid released brakes for said motors, and unitary means for selectively supplying A. C. to either of said motors, D. C. of the same order of current value to the other of said motors, and current to said solenoids for releasing said brakes.

2. Apparatus of the class described including an A. C. drive motor, an A. C. takeup motor and an A. C. rewind motor, and means for selectively supplying A. C. to said driven motor and said takeup motor and D. C. to said rewind motor or for supplying A. C. to said rewind motor only and D. C. to said takeup motor and simultaneously rendering a sound reproducer inoperative.

3. Apparatus of the class described including an A. C. drive motor, an A. C. takeup motor and an A. C. rewind motor, and means for selectively supplying A. C. to said driven motor and said takeup motor and D. C. to said rewind motor or for supplying A. C. to said rewind motor only and D. C. to said takeup motor and simultaneously rendering a sound reproducer inoperative, said means including means for rendering the sound reproducer inoperative during the switching operation.

4. Apparatus of the class described including an A. C. drive motor, an A. C. takeup motor and an A. C. rewind motor, solenoid released brakes on said rewind and takeup motors, and means for selectively supplying A. C. to said drive motor, said takeup motor and said solenoids and D. C. to said rewind motor or for supplying A. C. to said rewind motor and said solenoids only and D. C. to said takeup motor.

5. Apparatus of the class described including an A. C. drive motor, an A. C. takeup motor, an A. C. rewind motor, and a sound reproducer, solenoid released brakes on said rewind and takeup motors, and means for selectively supplying A. C. to said sound reproducer, said drive motor, said takeup motor and said solenoids and D. C. to said rewind motor or for supplying A. C. to said rewind motor and said solenoids only and D. C. to said takeup motor.

6. Apparatus of the class described including an A. C. drive motor, an A. C. takeup motor and an A. C. rewind motor, solenoid released brakes on said rewind and takeup motors and an exciter lamp, and means for selectively supplying A. C. to said drive motor, said takeup motor and said solenoids and D. C. to said rewind motor and the exciter lamp or for supplying A. C. to said rewind motor and said solenoids only and D. C. to said takeup motor.

7. Apparatus of the class described including an A. C. drive motor, an A. C. takeup motor and an A. C. rewind motor, solenoid released brakes on said rewind and takeup motors, and means for selectively supplying A. C. to said drive motor, said takeup motor and said solenoids and D. C. to said rewind motor or for supplying A. C. to said rewind motor and said solenoids only and D. C. to said takeup motor, said means including means for rendering a sound reproducer inoperative during the switching operation.

JOSEPH L. UNDERHILL.